Patented Feb. 13, 1940

2,189,873

UNITED STATES PATENT OFFICE 2,189,873

GREASE AND METHOD OF MAKING SAME

John C. Zimmer, Hillside, and Arnold J. Morway, Roselle, N. J., assignors to Standard Oil Development Company, a corporation of Delaware No Drawing. Application April 7, 1938,
Serial No. 200,682

10 Claims. (Cl. 87—9)

This invention relates to improvements in greases and more specifically to improved cohesive aluminum soap greases.

Of the many classes of greases manufactured at the present time, there are two particular types concerned with in this invention, each having its own specific use. One type is known as the "buttery" or "non-cohesive" grease which lacks the ability of withstanding shock in open spaces due to its splattering properties. Another type is the "cohesive" grease which has the property of sticking together under impact.

It is well known that an oil soluble aluminum soap such as aluminum stearate, when dissolved in an oil of the required viscosity, will produce a gel type of grease generally termed as "buttery" or "non-cohesive." These greases are employed to a wide extent for chassis lubrication since they are made very easily without any elaborate equipment. Simple heating of the soap with the oil is all that is required. The difficulty with these lubricants is that at ordinary temperatures they are too easily broken down on agitation or mechanical working, thereby causing poor lubrication. They are also very hard at low temperatures.

The addition of small amounts of glycerin to such greases produces an oily, stringy, cohesive lubricant which is not susceptible to excessive breakdown splattering at room temperature or higher temperatures. However, such greases also show the serious disadvantage of excessive hardening at low temperatures, resulting in an almost complete loss in lubricating power.

The purpose of this invention is to overcome this difficulty and to produce a cohesive grease having superior lubricating and non-splattering properties at low, ordinary, and high temperatures of the range encountered in most industrial applications. A specific purpose is to incorporate controlled amounts of glycerin and polymers of the type exemplified by the product obtained when isobutylene is polymerized at low temperatures below —20° C. and preferably of the order of about —80° C. with boron fluoride or equivalent materials as a catalyst. This material is a substantially saturated very light colored amorphous mass exceptionally stable to oxidation and ranging from a very viscous liquid to a horny solid, depending on the molecular weight, which may be 800, 2000, 6000, 10,000 or even 30,000 or even 300,000 or more, as determined by the viscosity method described by H. Staudinger on page 56 of his "Die Hochmolekularen Organischen Verbindungen" Berlin 1932 Verlag von Julius Springer, depending on the purity of the isobutylene, the temperature, and other conditions under which polymerization is conducted. The term "soluble" is employed in the sense that the polymer is completely miscible with hydrocarbons in all concentrations, as differentiated by the "swelling" effect of rubber and other similar materials which possess only a very limited miscibility and form a colloidal gel rather than a solution type of mixture. Furthermore, rubber has not been found suitable for the purposes of this invention since it hardens at low temperatures and possesses other undesirable properties. It might be further mentioned that the oil soluble polymer thickeners herein referred to increase the viscosity of the oil and generally also improve the viscosity index thereof.

These substantially saturated polymer thickeners are characterized by their low iodine numbers. When freed of unsaturated low molecular weight impurities by known methods, their iodine numbers do not exceed a value of about 10, as determined by the Hanus method. For example, the following data are available on the unsaturation of a number of polymers of the class disclosed herein:

| Polymer | Approx. mol. wt. (viscosity method) | Purification | Iodine No. (cgs. I/gm.) |
|---|---|---|---|
| Polyisobutylene | 13,000 (substantially none under 10,000) | Precipitation from solution with dioxan | 4.7 |
| Do | 70,000 (substantially none under 40,000) | Precipitation with liquid ethylene | 1.6 |
| Polyester of hydroxy stearic acid | 3500 | Extraction with butyl alcohol | 5.8 |
| Hydro rubber | 40,000 | | 9.9 |
| Do | 40,000 | | 9.8 | linear oil soluble polymer thickener to the oil solution of the oil soluble aluminum soap such as aluminum stearate, aluminum naphthenate, and the like.

The latter term is applied to linear soluble

Another example of thickener which may be employed in many cases is the polyester of hydroxy stearic or similar acids, produced by heating hydroxy stearic acid in an inert atmosphere at about 185–190° C. for 50–80 hours preferably in presence of about 0.1% of a dibasic acid such as adipic acid. This material may reach a molecular weight of 5000, 14,000, or even 20,000 or higher. A further example which may be used in some instances is a product known as hydro-rubber. This material is obtained by the hydrogenation of rubber and is entirely different from the parent substance in its properties and behavior.

These thickeners when blended in the oil-soap solution containing the proper amount of glycerin will not allow any appreciable breakdown of structure on continued working and they impart an extremely low consistency variation over a large temperature range. While the grease is quite adhesive, it does not become ropey, and therefore is not easily pulled out from the housing or bearing shaft. In concentrations of 0.05 to 0.2%, glycerin added to the greases according to this invention produces a semi-fluid lubricant of low internal friction. Concentrations of 0.2 to 2% give a fluid grease which is ropey and stiff and has a high internal friction. With excessive amounts of glycerin, say over 5%, such as those obtained when the grease is prepared from natural glycerides, a thin soupy oil is obtained which is not elastic and ropey and is unsuitable for pressure gun and other uses unless much larger quantities of soap are added, thereby introducing increased difficulties in processing and other operations. Without glycerin, a buttery rather than a cohesive type of grease is obtained.

The amount of glycerin to be added may be varied from 0.05 to 0.15% or 0.2%. Other compounds such as polyglycols, polyglycerols, and the like, may be used with or instead of the glycerin. The amount of thickener to be added is from 0.1 to 1 to 5 or even 20% when polymerized isobutylene or hydro rubber are employed, while oxygenated thickeners of the polyester type may be employed in larger quantities as for example to 10 or 50%. It is noted that only narrow ranges are fixed for both of these blending agents beyond which a satisfactory product is not easily or readily prepared. An aluminum stearate grease containing these materials in the proportions stated possesses more adhesiveness than other usual greases and is not subject to marked changes in consistency on working. The polymer thickener apparently plasticizes the grease at low temperature so that it remains perfectly soft and stringy at all temperatures usually encountered. Under impact such greases will not be spattered away leaving a dry bearing.

Another feature of this invention is that while ordinary aluminum stearate greases require light oils of about 200-500 viscosity Saybolt at 100° F. for producing a reasonably hard grease without the use of excessive quantities of soap, an oil of 200 to 1000 viscosity at 100° F. or even higher may be employed in greases containing the thickeners without any noticeable detrimental softening. For this use, any oil of the proper viscosity is satisfactory, although a highly aromatic or naphthenic base is preferred, such as those obtained from Venezuelan, Colombian or Gulf Coastal crudes. Paraffinic oils and other types, either in the crude, refined or highly refined state have been used successfully.

The preferred method of preparing these greases consists in heating together the specified quantities of aluminum stearate, glycerin, and oil with constant agitation to about 300° F. when the metal compound goes into solution, and the temperature is then allowed to decrease to about 200° F. when the thickener is added, preferably as a 10-30% solution in oil, the latter solution also being at 200° F. The oil is preferably the same as that employed in preparing the grease, although other oils may be used.

The amount of aluminum soap, e. g. aluminum stearate, aluminum naphthenate and the like, added may vary from 2 to 5 to about 15%. The grease so prepared may be admixed with other greases, such as lime or soda or mixed base greases. Other materials which may be added to the greases prepared according to this invention are oiliness agents such as fatty acids, glycerides, other esters, oxidized oils and waxes, etc., extreme pressure lubricating agents such as sulfur, chlorine, selenium, and similar substances, oxidation inhibitors, pour inhibitors, volatolized compounds, dyes, resins, colloidal metals, graphite, mica, talc, soapstone, whiting and other cushioning agents or natural lubricants and the like.

The greases so prepared are exceptionally suited for the lubrication of chassis, spring shackles, travelling cranes, cams, textile machinery, and other equipment requiring a very adhesive grease not subject to being thrown out by centrifugal force, or spattering.

The following example serves to show some of the phases involved in this invention:

Example

A grease prepared according to the above method, had the following composition:

|   | Per cent |
|---|---|
| Aluminum stearate | 6 |
| Glycerin | 0.2 |
| Polymerized isobutylene (mol. wt. approx. 13,000) | 15.0 |
| Colombia distillate 300 vis. Saybolt at 100° F. | 78.8 |

Consistency measurements were made on the Gardner mobilometer, an apparatus described in Circular No. 394, Scientific Section, Educational Bureau American Paint and Varnish Manufacturing Association, for measuring the consistency by timing the speed of a weighed disk through a known quantity of the grease. These data, when compared with those obtained with the best known commercial viscous chassis lubricants of this type are as follows:

| Grease | 250 gm. disk unworked @ 77° F. | 250 gm. disk worked @ 77° F. | 250 gm. disk worked @ 30° F. |
|---|---|---|---|
|  | Time, seconds | Time, seconds | Time, seconds |
| Commercial chassis lubricant (containing about 7% lime soaps and about 0.5% rubber) | 81.0 | 12.8 | 205. |
| 6% aluminum stearate 94% 300 vis. oil | Too hard to measure | | Very hard. |
| Commercial aluminum stearate-glycerin grease (containing 8% aluminum stearate and 0.5% glycerin) | 75.4 | 45.8 | Too hard to measure. |
| Grease made according to example given | 15.8 | 15.8 | 77. |

These data show that while the commercial lubricant has an enormous breakdown, i. e., 81 to 12.8 seconds after working, the grease prepared according to this invention showed no breakdown on working. This breakdown in structure shows up as leakage from the housings and other parts of the chassis, giving improper lubrication. Furthermore, at low temperature, the difference in consistency is again shown. While the grease prepared according to this invention hardens somewhat at 30° F., it still retains its smooth adhesive quality and does not become rubbery or harden with loss of all lubricity. It will also be noted that the ordinary 6% aluminum stearate grease was too hard to give any reliable values.

This application is a continuation-in-part of our previous application Serial No. 750,670 filed on October 30, 1934.

Although we have shown and described certain specific embodiments of our invention, we are fully aware that many modifications thereof are possible. Our invention, therefore, is not to be restricted except insofar as it is necessitated by the prior art and by the spirit of the appended claims.

We claim:

1. A cohesive aluminum soap grease containing a high molecular weight, soluble substantially saturated, linear polymer thickener having a Hanus iodine number of not over about 10 when substantially free of impurities, and having an average molecular weight in excess of 800, as determined by the viscosity method, said grease containing from about 0.05 to 2.0% of a polyhydric alcohol.

2. A cohesive grease according to claim 1 in which the aluminum soap is aluminum stearate.

3. A cohesive grease according to claim 1 in which the aluminum soap is aluminum naphthenate.

4. A cohesive grease according to claim 1 in which the polymer thickener is polyisobutylene.

5. A cohesive grease comprising about 2 to 15% aluminum stearate, about 0.1 to 20% of a high molecular weight substantially saturated soluble linear polymer thickener having a Hanus iodine number of not over about 10 when substantially free of impurities, and having an average molecular weight in excess of 800 as determined by the viscosity method, said grease containing from about 0.05 to 2% of a polyhydric alcohol.

6. A cohesive grease comprising an oil of about 200–1000 viscosity Saybolt at 100° F., about 2 to 20% aluminum stearate, about 1 to 10% of a high molecular weight soluble substantially saturated polymer thickener having a Hanus iodine number of not over about 10 when substantially free of impurities, and having an average molecular weight in excess of 800 as determined by the viscosity method, said grease containing from about 0.05 to 2% of a polyhydric alcohol.

7. A cohesive grease according to claim 6 in which the oil is a petroleum oil from the class consisting of aromatic and naphthenic crudes.

8. A method of producing a cohesive grease comprising heating to 300° F. a mixture of aluminum soap, lubricating oil, and a small amount of glycerine in proportion of about 0.05 to 2%, cooling the mixture to about 200° F., and mixing with it a lubricating oil solution containing about 10 to 30% of a high molecular weight linear soluble substantially saturated polymer thickener having a Hanus iodine number of not over about 10 when substantially free of impurities, and having an average molecular weight in excess of 800 as determined by the viscosity method, said solution being preheated to about 200° F. prior to mixing.

9. A grease according to claim 1 in which the polymer has a molecular weight below about 30,000.

10. A cohesive grease comprising a mineral lube oil base stock obtained from an aromatic or naphthenic type crude petroleum, about 0.1 to 20% of linear polymer of isobutylene having a molecular weight between about 800 and 30,000 as determined by the viscosity method, about 2 to 15% of aluminum soap and about 0.05 to 2.0% of glycerine.

JOHN C. ZIMMER.
ARNOLD J. MORWAY.